United States Patent [19]

Ishizuka et al.

[11] 4,008,195
[45] Feb. 15, 1977

[54] AQUEOUS INSULATING VARNISHES

[75] Inventors: Takashi Ishizuka; Naoki Miwa, both of Ibaraki, Japan

[73] Assignee: Nitto Electric Industrial Co., Ltd., Ibaraki, Japan

[22] Filed: Aug. 16, 1974

[21] Appl. No.: 498,020

[30] Foreign Application Priority Data

Aug. 16, 1973 Japan .............................. 48-91849

[52] U.S. Cl. .................. 260/29.2 N; 260/29.2 E; 260/78 TF; 260/857 PA; 260/857 PE; 428/375; 428/423; 428/457
[51] Int. Cl.² .................. B32B 15/08; C08L 79/08
[58] Field of Search ................ 260/29.2 N, 29.2 E, 260/857 PA, 857 PE, 862, 873; 428/375, 423, 457

[56] References Cited

UNITED STATES PATENTS

| | | | |
|---|---|---|---|
| 3,223,666 | 12/1965 | Bolton .......................... | 260/29.2 E |
| 3,528,937 | 2/1968 | Reynolds et al. .............. | 260/29.2 N |
| 3,573,132 | 3/1971 | Ducloux et al. ............... | 260/29.2 N |
| 3,634,304 | 1/1972 | Suzuki et al. ................. | 260/857 PA |

FOREIGN PATENTS OR APPLICATIONS 1,093,734  12/1967  United Kingdom ......... 260/857 PA

*Primary Examiner*—J. Ziegler
*Attorney, Agent, or Firm*—Sughrue, Rothwell, Mion, Zinn & Macpeak

[57] ABSTRACT

An aqueous insulating varnish which comprises an aqueous medium containing dissolved therein a resin containing ester groups, imide groups and free carboxyl groups in the resin molecule, with a volatile base selected from the group consisting of ammonia and a volatile organic amine to render the resin soluble, the resin comprising the reaction product of A. a carboxyl group containing polyol (containing ester groups in the molecule) comprising the reaction product of
  1. an organic carboxylic acid component comprising
     a. about 15 to 100 mol% of at least one of an aromatic tricarboxylic acid and the anhydride thereof in which up to 30 mol% of the aromatic tricarboxylic acid and the anhydride thereof can be replaced by at least one of an aromatic tetracarboxylic acid and the anhydride thereof, and
     b. about 0 to 85 mol% of at least one of a dicarboxylic acid and the anhydride thereof; and
  2. an organic alcohol component comprising at least one organic polyhydric alcohol;
B. butane tetracarboxylic acid and/or an imide-forming derivative thereof; and
C. at least one organic diamine.

14 Claims, No Drawings

AQUEOUS INSULATING VARNISHES

BACKGROUND OF THE INVENTION

1. FIELD OF THE INVENTION

The present invention relates to aqueous insulating varnishes.

2. DESCRIPTION OF THE PRIOR ART

Hitherto, almost all insulating varnishes and particularly wire enamels are the so-called solvent type varnishes in which an organic solvent such as cresol, xylene or naphtha is used. These varnishes have the defects that the solvent and gases of decomposition are dispersed in the air in the production of the insulated wires and the cost is high because the solvent should be completely incinerated by a combustion furnace. Further, organic solvents not only cause environmental problems such as air pollution but also the working environment is not always good because of the bad odor and fire is always a hazard because the solvents are inflammable. Recently, it is particularly desired to obtain insulating varnishes which do not have those defects that give rise to a poor environment.

SUMMARY OF THE INVENTION

It is an object of the present invention to provide insulating varnishes which do not have the above described defects.

As the result of studies for improving the above described prior defects, it has been found that an aqueous insulating varnish which comprises an aqueous medium containing dissolved therein a resin containing ester groups, imide groups and free carboxyl groups in the resin molecule, with a volatile base selected from the group consisting of ammonia and volatile organic amine to render the resin soluble, the resin comprising the reaction product of A. a carboxyl group containing polyol (containing ester groups in the molecule) comprising the reaction product of 1. an organic carboxylic acid component comprising
   a. about 15 to 100 mol% of at least one of an aromatic tricarboxylic acid and the anhydride thereof in which up to 30 mol% of the aromatic tricarboxylic acid and the anhydride thereof can be replaced by at least one of an aromatic tetracarboxylic acid and the anhydride thereof, and
   b. about 0 to 85 mol% of at least one of a dicarboxylic acid and the anhydride thereof; and
2. an organic alcohol component comprising at least one organic polyhydric alcohol;

B. butane tetracarboxylic acid and/or an imide-forming derivative thereof; and

C. at least one organic diamine has excellent properties as an insulating varnish, and thus the present invention has been accomplished.

DETAILED DESCRIPTION OF THE INVENTION

Aromatic tricarboxylic acids which can be used in this invention include trimellitic acid or the anhydride thereof, hemimellitic acid or the anhydride thereof and trimesic acid having the formula

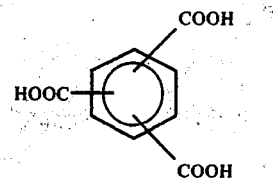

3,4,3'(or 3,4,4',etc.)-diphenyltricarboxylic acid having the formula

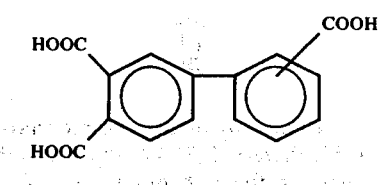

or the anhydride thereof, 3,4,3'(or 3,4,4', etc.)-tricarboxydiphenylmethane, 3,4,3'(or 3,4,4', etc.) -tricarboxydiphenyl ether, 3,4,3'(or 3,4,4', etc.)-tricarboxydiphenyl sulfide, 3,4,3'(or 3,4,4', etc.)-tricarboxydiphenyl sulfone, 3,4,3'(or 3,4,4', etc.)-tricarboxydiphenyl ketone and 3,4,3'(or 3,4,4',etc.)-tricarboxydiphenylpropane having the formula

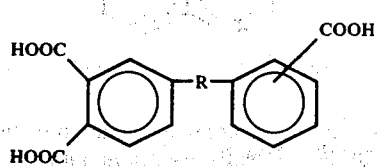

wherein R represents a methylene group, an oxygen atom, a sulfur atom, a $-SO_2-$ group, a

group or a

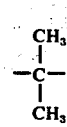

group, or the anhydrides thereof, or mixtures thereof.

In the present invention, a part, i.e., up to about 30 mol%, of the above described aromatic tricarboxylic acid or the anhydride thereof can be replaced by an aromatic tetracarboxylic acid or the anhydride thereof to prepare the water-soluble insulating varnish. Such an aromatic tetracarboxylic acid or the anhydride thereof includes (i) pyromellitic acid or the anhydride thereof, 3,3',4,4'-diphenyltetracarboxylic acid or the anhydride thereof, or the isomers thereof; (ii) those represented by the general formula

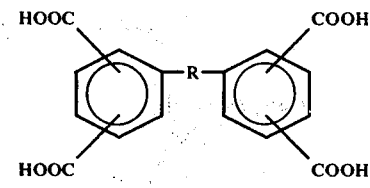

wherein R represents —O—, —CH$_2$—, —S—, —SO$_2$—, —CO— or

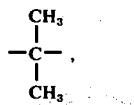

such as 3,3',4,4'-diphenylmethanetetracarboxylic acid or the anhydride thereof, 3,3',4,4'-diphenyl ether tetracarboxylic acid or the anhydride thereof, 3,3',4,4'-diphenylketonetetracarboxylic acid or the anhydride thereof, 3,3',4,4'-diphenylsulfonetetracarboxylic acid or the anhydride thereof, 3,3',4,4'-diphenylsulfidetetracarboxylic acid and the like; and (iii) those represented by the formula

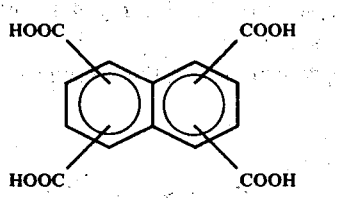

, such as 1,2,5,6-naphthalenetetracarboxylic acid or the anhydride thereof, 1,4,5,8-naphthalenetetracarboxylic acid, 2,3,6,7-naphthalenetetracarboxylic acid and the like.

Organic dibasic carboxylic acids or the anhydrides thereof which can be used together with the aromatic tricarboxylic acids or the anhydrides thereof include succinic acid, succinic anhydride, malonic acid, adipic acid, sebacic acid, phthalic acid, phthalic anhydride, isophthalic acid, terephthalic acid, naphthalene-1,4 (or 1,5, 2,6,etc.)-dicarboxylic acid having the formula

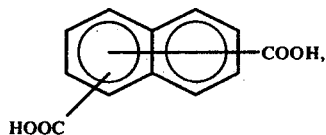

3,3'(or 4,4',etc.)-dicarboxyldiphenyl having the formula

or 3,3'(or 4,4', etc.)-dicarboxydiphenyl sulfide, 3,3'(or 4,4', etc.)-dicarboxydiphenylmethane, 3,3''(or 4,4', etc.)-dicarboxydiphenylmethane, 3,3'(or 4,4'', etc.)-dicarboxydiphenyl ether, 3,3'(or 4,4', etc.)-dicarboxydiphenyl sulfone, 3,3'(or 4,4', etc.)-dicarboxydiphe-nyl ketone, or 3,3'(or 4,4', etc.)-dicarboxydiphenylpropane having the formula

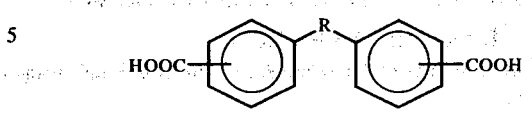

wherein R represents a methylene group, an oxygen atom, a sulfur atom, a —SO$_2$— group, a

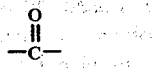

group or a

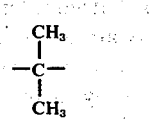

group or mixtures thereof.

As the organic polyhydric alcohols, any aliphatic and aromatic alcohols can be used in the present invention. Examples of such alcohols include ethylene glycol, propylene glycol, 1,4-butanediol, 1,5-pentanediol, 1,6-hexanediol, 1,7-heptanediol, 1,8-octanediol, 1,9-nonanediol, 1,10-decanediol, diethylene glycol, dipropylene glycol, triethylene glycol, glycerin, trimethylolpropane, tris(2-hydroxyethyl)isocyanurate, 1,2,6-hexanetriol, 3-methyl-1,3,5-hexane triol, pentaerythritol, 4,4'-dihydroxymethyldiphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'-dihydroxymethyldiphenyl sulfone, 4,4'-dihydroxymethyldiphenyl sulfone, 4,4'-dihydroxymethyldiphenyl ketone, 4,4'-dihydroxymethyldiphenylpropane, 4,4'-dihydroxyethyldiphenylpropane, 4,4'-dihydroxymethyl sulfide, 4,4'-dihydroxyethyldiphenyl sulfide and mixtures thereof. Further, as the organic polyhydric alcohols, bis-(2-hydroxyethyl)terephthalate, ibs-(2-hydroxyethyl)isophthalate, bis-(3-hydroxypropyl)-terephthalate and oligomers thereof can be used alone or as a mixture thereof, or can be used together with above described polyhydric alcohols.

As the imide forming derivatives of butane tetracarboxylic acid, butane tetracarboxylic acid monoanhydride, butane tetracarboxylic acid dianhydride, butane tetracarboxylic acid dimethyl ester, butane tetracarboxylic diethyl ester, butane tetracarboxylic dipropyl ester, butane tetracarboxylic dibutyl ester, butane tetracarboxylic diamide and butane tetracarboxylic diammonium salt can be used in the present invention, which form imide groups by reacting with the organic diamines.

Organic diamines which can be used in the present invention include any aliphatic and aromatic diamines and mixtures thereof, for example, those diamines having the following general formulae:

where n is an integer not greater than 10,

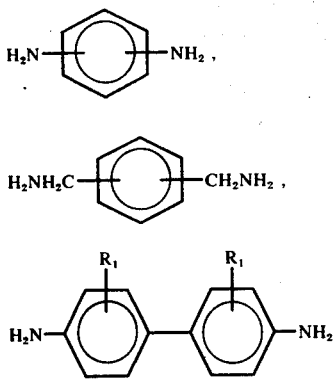

where $R_1$ represents a hydrogen atom, an alkoxy group, an alkyl group or a halogen atom,

and

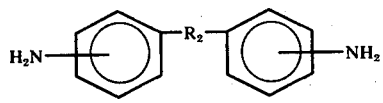

where $R_2$ represents a $-CH_2-$, $-O-$, $-CH_2CH_2-$, $-CONH-$,

$-S-$ or $-SO_2-$ group.

Typical examples of these diamines are ethylenediamine, hexamethylenediamine, heptamethylenediamine, octamethylenediamine, nonamethylenediamine, meta-xylylenediamine, para-xylylenediamine, meta-phenylenediamine, para-phenylenediamine, benzidine, 3,3'-dimethoxybenzidine, 3,3'-dichlorobenzidine, 3,3'-dimethylbenzidine, 1,5-diaminonaphthalene, 2,6-diaminonaphthalene, 4,4'-diaminodiphenylmethane, 4,4'-diaminodiphenyl ether, 3,4'-diaminodiphenyl ether, 4,4'-diaminodiphenyl ether, 3,4'- diaminodiphenyl ether, 4,4'-diaminodiphenylpropane, 4,4'-diaminodiphenyl sulfide, 4,4'-diaminodiphenyl sulfone, 3,3'-diaminodiphenyl sulfone, 3,4-diaminobenzanilide and the like. In addition to those described above, 2,4-bis(β-amino-t-butyl)toluene, bis [p-(β-amino-t-butyl) phenyl] ether and the like can also be used as a diamine.

The reason why the aromatic tricarboxylic acids (or anhydrides thereof) should be used in the amount of at least 15 mol% is because the resulting resin has poor solubility in water and the thermal and electric properties of the coating films obtained are deteriorated, if they not used in an amount of at least 15 mol%. The aromatic tricarboxylic acid can suitably be used up to about 100 mol%. A preferred range is from about 50 to 100%.

The aqueous insulating varnishes of the present invention can be produced as follows.

The organic polycarboxylic acids (or anhydrides thereof) containing at least 15 mol% of aromatic tricarboxylic acids (or anhydrides thereof) as described hereinbefore are reacted with an excess amount of organic polyhydric alcohols to produce a carboxyl group containing polyol.

In this reaction, the equivalent ratio of the acids and the alcohols (OH/COOH) is in a range of about 1.0 to 3.0 and preferably 1.15 to 1.95. If the equivalent ratio is less than about 1.0, a gelation occurs during the reaction step before the molecular weight is increased sufficiently. If the equivalent ratio is more than about 3.0, the resulting carboxyl group containing polyol has too low a molecular weight and thus it is difficult to form to tough film by baking the resulting aqueous insulating varnish.

Of course, more than about 3.0 can be used if the organic polyhydric alcohol is removed from the reaction system by distillation of the resulting reaction product in vacuum to increase the molecular weight of the carboxyl group containing polyol.

The reaction temperature of this step generally is about 100° to 300° C and preferably 160° to 220° C. When the reaction is carried out for a few hours at the above described temperature, water is distilled off and the reaction mixture gradually becomes viscous and the acid number thereof gradually decreases. However, the reaction is usually stopped when the acid number is in a range of about 10 to 150 and preferably 20 to 100.

If the acid number is below about 10, the finally resulting aqueous insulating varnish is cloudy, and mechanical properties of the baked coating film and the film appearance deteriorate. If the acid number is above about 150, the carboxyl group containing polyol remains in the baked coating film of the resulting varnish, because the number of residual carboxyl groups is unnecessarily large and consequently the electrical and thermal properties of the baked coating film deteriorate.

Then the butane tetracarboxylic acid (or imide forming derivative thereof) (hereinafter, for brevity it is designated "BTC") and the organic diamines are added to the resulting carboxyl group containing polyol to carry out the reaction so as to produce a resin.

In this case, the BTC is usually added in the amount of about 2.5 to 250 parts by the weight and preferably 5 to 150 parts by the weight based on 100 parts of the carboxyl group containing polyol. If the BTC is added in an amount below 2.5 parts by weight, the resulting aqueous insulating varnish has inferior film-forming properties and consequently the wire speed in the production of insulated wires in which the varnish is used decreases and the resulting coating film has poor thermal resistance. If the BTC is added in an amount above 250 parts by weight, the resulting aqueous insulating varnish sometimes becomes cloudy. Accordingly, this is not preferred.

The organic diamines added are usually used in a molar ratio such that the ratio of BTC/organic diamine ranges from about 1/4 to 5 and preferably 1/2 to 2. If the molar ratio is below 1/4, unreacted organic diamines remain in the finally produced aqueous insulating varnish causing the varnish to be cloudy.

If the diamines are added in a molar ratio of above 5, there is the possibility of gelation during the reaction. In this step, when the reaction is usually carried out at about 100° to 300° and preferably 160° to 200° C, an imide forming reaction and an esterification reaction proceed and water is removed. In this case, the formation of amido groups partially occurs. When the acid number of the reaction product becomes in a range of about 20 to 100, the reaction is stopped and thus a viscous brown resin is produced. Then a basic compound such as an aqueous ammonia solution and water are added thereto to dissolve the resin therein, and thus an aqueous insulating varnish is obtained.

The resulting aqueous insulating varnishes contain ester groups and imide groups in the molecule and form coating films having an excellent insulating property, because the basic compound such as ammonia is dissociated on baking and cross-linking of molecules proceeds.

The reason why the reaction should be stopped at the point when the acid number of the reaction product becomes about 20 to 100 is as follows. When the acid number is below 20, the reaction product is not water soluble and sometimes it is cloudy even if a basic compound such as ammonia is added, while if the acid number is above 100, unreacted materials remain in a large amount and it is difficult to produce tough films when the resulting aqueous insulating varnish is baked.

As compounds for providing water soluble properties, basic compounds which are volatile at the temperatures of baking the aqueous insulating varnish can be used in addition to the above described aqueous ammonia solution. Typical examples of such compounds include trialkylamines such as triethylamine, trimethylamine and tributylamine, N-alkyldiethanolamines such as N-methyldiethanolamine, N-ethyl diethanolamine and N-propyldiethanolamine, N,N-dialkylethanolamines such as N,N-dimethylethanolamine, N,N-diethylethanolamine and N,N-dibutylethanolamine, monoethanolamine, diethanolamine, triethanolamine and mixtures of these compounds. These compounds are added in an amount sufficient to convert the resin into a water soluble resin. That is, they are added in an amount sufficient to neutralize the carboxyl groups present in the resin. However, water-solubilization does not necessarily require conversion of all of the carboxyl groups remaining in the resin into the salt form. Therefore, they only have to be added in an amount greater than that which enables the conversion of the resin into a water soluble resin, generally from about 0.3 to about 3 equivalents to the remaining carboxyl groups. Ammonia or an aqueous ammonia solution can be added in a large excess amount, because the excess thereof can be removed by heating the varnishes to about 100° C.

The functional characteristics of varnishes according to the present invention will vary to some extent depending upon starting materials and the degree of polymerization employed, but generally the concentration of the components contained in the aqueous solution can range from about 30 to about 55% by weight (measured as solid content at 105° C ± 20° C for 2 hours) with the viscosity being in the range of about 1 to about 100 poises (measured at 30° C using a B type viscosimeter).

Further, a film-forming assistant (co-solvent) can also be employed in order to improve the flowability of the varnish at baking and the appearance of the resulting baked coating film. Such an assistant can be added in an amount ranging from about 5 to about 50% by weight based on the weight of the non-volatile components contained in the varnish. Examples of the film-forming assistants are ethylene glycol monomethyl ether, ethylene glycol monoethyl ether, ethylene glycol monoisopropyl ether, ethylene glycol monobutyl ether, ethylene glycol monoisobutyl ether, diethylene glycol monoethyl ether, diethylene glycol monoisopropyl ether, diethylene glycol monobutyl ether, diethylene glycol monoisobutyl ether, triethylene glycol monomethyl ether, triethylene glycol monoethyl ether, triethylene glycol monobutyl ether, ethylene glycol monomethyl ether acetate, ethylene glycol monoethyl ether acetate, ethylene glycol, propylene glycol, diethylene glycol, dipropylene glycol, triethylene glycol, glycerin, N,N-dimethylformamide, N,N-dimethylacetamide, N,N-diethylformamide, N-methyl-2-pyrrolidone, N,N-diethylacetamide, N,N-dimethylmethoxyacetamide, N-methylcaprolactam and the like.

The aqueous insulating varnishes of the present invention are useful for electric insulation and particularly as wire enamels. They can also be used for producing flexible printedcircuit plates, flat heating plates and tape cables by applying them to conductive foils and baking. If desired, they can be used in transports such as vehicles, ships and aircraft, building materials such as aluminium window sashes and household goods such as refrigerators and washing machines. Further, the aqueous insulating varnishes of the present invention can be used as coatings for top coat and primer coatings. A suitable baking temperature can range from above about 200° C, preferably 300° to 500° C.

In the prior art solvent type varnishes, coating films having sufficiently satisfactory properties can not be obtained if organic metal compounds (for example, tetrabutyl titanate) are not added as the cross-linking agent at baking. However, according to the present invention, baked coating films having excellent properties can be obtained even if such cross-linking agents are not used, which is one of the characteristics of the present invention. However, if desired, water soluble organic metal compounds such as ammonium titanium lactate and ammonium zirconium lactate, water soluble phenol resins, water soluble amino resins, hexamethoxymethylated melamine, tris-(2-hydroxyethyl)-isocyanurate and triethanolamine can be added as a water soluble cross-linking agent.

The aqueous insulating varnishes obtained by the present invention can also be applied to conductors by electric methods for example, by electrophoresis and baked to obtain good coating films as disclosed in Japanese Patent Publication No. 10541/1974, British Patent Nos. 723,072 and 1,073,911 and French Patent No. 1,521,452.

The present invention is illustrated in greater detail by reference to the following examples. However, the present invention is not intended to be limited to these examples. Unless otherwise indicated, all parts, percents, ratios and the like are by weight.

EXAMPLE 1

230 g (1.2 mols) of trimellitic acid anhydride, 49.8 g (0.3 mols) of isophthalic acid, 102 g (1.65 mols) of ethylene glycol, 53 g (0.5 mols) of diethylene glycol and 83 g (0.9 mols) of glycerin were charged in a 1 liter 4-necked flask equipped with a condenser, a thermometer, a dropping funnel and a stirrer, and the mixture was heated with stirring. Water began to distill at 170° C. When the reaction was carried out at 180 to 200° C for 2.5 hours, 45 cc of water was distilled off to obtain a colorless viscous resinous product. The acid number of the resulting resinuous product was 61. The temperature was then reduced to 140° C and 23.4 g (0.1 mols) of 1,2,3,4-butanetetracarboxylic acid and 29.7 g (0.15 mols) of 4,4'-diaminodiphenylmethane were added thereto. The mixture turned reddish brown. When the heating was continued, water began to distill at 150° C. When the reaction was carried out at 160° to 200° C for 1 hour, 12 cc of water was distilled off and the acid number became 38. After the temperature was reduced to 110° C, 50 g of aqueous ammonia (concentration: above 28%) diluted with 100 cc of water was added thereto followed by stirring at 100° C for 30 minutes whereby the excess of the ammonia vaporized off and a blackish brown transparent resinous insulating varnish was obtained. The resulting varnish was diluted with water to a viscosity of 12 poises (value at 30° C, B-type viscosimeter). The non-volatile content of this varnish was found to be 40.5% (105 ± 20° C, for 2 hours). The aqueous insulating varnish thus obtained was applied onto an annealed copper wire having a diameter of 1.0 mm using dies and baked at 400° C at a rate of 6.5 m/min by passing the coated wire through a vertical furnace having a height of 3.0 m. The properties of the resulting wire having a baked coating of the varnish thereon were evaluated according to the method described in JIS C-3210 ( Polyester Wire Testing Method, hereinafter the same) and the results obtained are shown in Table 1 below. Further, an aqueous insulating varnish was prepared in the same manner as described above but using 109 g (0.2 mols) of diphenylmethaneN,N-'-ditrimellitimide in place of the isophthalic acid as used above. The resulting varnish was applied to a copper plate of a length of 120 mm, a width of 50 mm and a thickness of 1.0 mm followed by baking at 250° C for 10 minutes to obtain a strong coating film having good adhesion to the copper plate.

EXAMPLE 2

192 g (1.0 mol) of trimellitic acid anhydride, 49.8 g (0.3 mols) of isophthalic acid, 133.3 g (2.15 mols) of ethylene glycol and 83 g (0.9 mols) of glycerin were charged in a 1 liter 4-neck flask equipped with a condenser, a thermometer, a dropping funnel and a stirrer, and the mixture was heated with stirring. Water began to distill at 170° C. When the reaction was carried out at 180° to 200° C for 3 hours, 32 cc of water was distilled to obtain a transparent resinous product having an acid number of 68. The temperature was then reduced to 140° C and 46.8 g (0.2 mols) of 1,2,3,4-butanetetracarboxylic acid and 59.4 g (0.3 mols) of 4,4'-diaminodiphenylmethane were added thereto. The mixture turned reddish brown. When the heating was continued, water began to distill at about 150° C. When the reaction was carried out at 160° to 200° C for 2 hours, 26 cc of water was distilled and the acid number became 35. The temperature was then reduced to 110° C and 30 g of aqueous ammonia (concentration: above 28%) diluted with 300 g of water was added using the dropping funnel. The mixture was stirred at 100° C for 30 minutes whereby the excess of ammonia was removed and a blackish brown transparent aqueous insulating varnish was obtained. This varnish was diluted with water to a viscosity of 12 poises (at 30° C, B-type viscosimeter). The non-volatile content of this varnish was found to be 38.3% (105° ± 2° C, for 2 hours). The varnish thus obtained was baked and applied onto an annealed copper wire in the same manner as described in Example 1. The properties of the resulting wire are shown in Table 1 below. Further, an aqueous insulating varnish was prepared in the same manner as described above but using 210 g (1.0 mol) of trimesic acid in place of the trimellitic acid as used above. The resulting varnish was applied onto a copper plate as described in Example 1 and baked at 250° C for 10 minutes to obtain a strong coating film having good adhesion to the copper plate.

EXAMPLE 3

192 g (1.0 mol) of trimellitic acid anhydride, 83 g (0.5 mols) of isophthalic acid, 124 g (2.0 mols) of ethylene glycol and 64 g (0.7 mols) of glycerine were charged in a 1 liter 4-neck flask equipped with a condenser, a thermometer, a dropping funnel and a stirrer, and the mixture was heated with stirring. Water began to distill at 170° C. When the reaction was carried out at 180° to 200° C for 1.5 hours, 33 cc of water was distilled to obtain a transparent resinous product having an acid number of 83. The temperature was then reduced to 140° C, and 93.6 g (0.4 mols) of 1,2,3,4-butanetetracarboxylic acid and 118.8 g (0.6 mols) of 4,4'-diaminodiphenylmethane were added thereto. The color of the mixture changed to a reddish brown color. When the heating was continued, water began to distill at about 150° C. The reaction was carried out at 160° to 200° C for 1.5hours whereby 42 cc of water was distilled and the acid number became 52. The temperature was then reduced to 110° C and 50 g of aqueous ammonia (concentration: above 28%) diluted with 300 g of water was added using the dropping funnel. The mixture was stirred at 100° C for 30 minutes whereby the excess of ammonia was removed and a blackish brown transparent aqueous insulating varnish was obtained. This varnish was diluted with water to a viscosity of 14 poises (at 30° C, B-type viscosimeter). The non-volatile content of this varnish was 39.1% (105° ± 2° C, for 2 hours). The varnish thus obtained was baked and applied onto an annealed copper wire in the same manner as described in Example 1. The properties of the resulting wire are shown in Table 1 below. Further, an aqueous insulating varnish was prepared in the same manner as described above but using 296 g (1.0 mol) of 3,4,3'-benzophenonetricarboxylic acid anhydride in place of the trimellitic acid as used above. The resulting varnish was applied onto a copper plate as described in Example 1 and baked at 250° C for 10 minutes to obtain a strong coating film having good adhesion to the copper plate.

EXAMPLE 4

230 g (1.2 mols) of trimellitic acid anhydride, 133.3 g (2.15 mols) of ethylene glycol and 83 g (0.9 mols) of glycerin were charged in a 1 liter 4-neck flask equipped with a condenser, a thermometer, a dropping funnel and a stirrer, and the mixture was heated with stirring. Water began to distill at 170° C. When the reaction was carried out at 180° to 200° C for 2 hours, 35 cc of water distilled to obtain a colorless transparent resinous product. The temperature was then reduced to 140° C and 23.4 g (0.1 mol) of 1,2,3,4-butanetetracarboxylic acid and 19.8 g (0.1 mol) of 4,4'-diaminodiphenylmethane were added thereto. The color of the mixture changed to a reddish brown color. When the heating was continued, water began to distill to about 150° C. The reaction was carried out at 160° to 200° C for 1.5 hours whereby 9 cc of water was distilled and the acid number of the resin became 35. The temperature was then reduced to 110° C, and 50 g of aqueous ammonia (concentration: above 28%) diluted with 100 g of water was added thereto using the dropping funnel. The mixture was stirred at 100° C for 30 minutes whereby the excess of ammonia was removed and a blackish brown transparent aqueous insulating varnish was obtained. This varnish was further diluted with water to a viscosity of 16 poises (at 30° C, B-type viscosimeter). The non-volatile content of this varnish was 40.2% (105° ± 2° C, for 2 hours). The varnish thus obtained was baked and applied onto an annealed copper wire in the same manner as described in Example 1. The properties of the resulting wire are shown in Table 1 below. Further, an aqueous insulating varnish was prepared in the same manner as described above but using 10.8 g (0.1 mol) of metaphenylenediamine in place of the 4,4'-diaminodiphenylmethane as used above. In addition, an aqueous insulating varnish was prepared in the same manner as described above but using 41.3 g of triethanolamine in place of the aqueous ammonia as used above. Each of the resulting varnishes was applied onto a copper plate as described in Example 1 and baked at 250° C for 10 minutes to obtain a strong coating film having good adhesion to the copper plate, respectively.

EXAMPLE 5

230 g (1.2 mols) of trimellitic acid anhydride, 49.8 g (0.3 mols) of terephthalic acid, 133.3 g (2.15 mols) of ethylene glycol, 52.2 g (0.2 mols) of tris-(2-hydroxyethyl)-isocyanurate and 64 g (0.7 mols) were charged in a 1 liter 4-neck flask equipped with a condenser, a thermometer, a dropping funnel and a stirrer, and the mixture was heated with stirring. Water began to distill at 200° C. When the reaction was carried out at 200 to 220° C for 4 hours, 45 cc of water was distilled and a colorless transparent resinous product having an acid number of 48 was obtained. The temperature was then reduced to 140° C, and 46.8 g (0.2 mols) of 1,2,3,4-butanetetracarboxylic acid and 19.8 g (0.1 mol) of 4,4'-diaminodiphenylmethane were added thereto. The color of the mixture changed to a reddish brown color. When the heating was continued, water began to distill at about 150° C. The reaction was carried out at 160° to 200° C for 1 hour whereby 7 cc of water was distilled and the acid number became 36. The temperature was then reduced to 110° C and 30 g of aqueous ammonia (concentration: above 28%) diluted with 300 g of water was added thereto using the dropping funnel. The mixture was stirred at 100° C for 30 minutes to remove the excess ammonia to obtain a blackish brown transparent aqueous insulating varnish. This varnish was further diluted with water to a viscosity of 15 poises (B-type viscosimeter, at 30° C). The non-volatile content of this varnish was 42.3% (105 ± 2° C, for 2 hours). The varnish thus obtained was baked and applied onto an annealed copper wire in the same manner as described in Example 1. The properties of the resulting wire are shown in Table 1 below. Further, an aqueous insulating varnish was prepared in the same manner as described above but using 77.4 g (0.3 mols) of 4,4'-dicarboxydiphenyl ether in place of the terephthalic acid as used above. In addition, an aqueous insulating varnish was prepared in the same manner as described above but using 41.5 g of N-methyldiethanolamine in place of the aqueous ammonia as used above. Each of the resulting varnishes was applied onto a copper plate as described in Example 1 and baked at 250° C for 10 minutes to obtain a strong coating film having good adhesion to the copper plate, respectively.

EXAMPLE 6

57.6 g (0.3 mols) of trimellitic acid anhydride, 166 g (1.0 mol) of isophthalic acid, 83 g (0.5 mols) of terephthalic acid, 124 g (2.0 mols) of ethylene glycol and 64.4 g (0.7 mols) of glycerin were charged in a 1 liter 4-neck flask equipped with a condenser, a thermometer, a dropping funnel and a stirrer, and the mixture was heated with stirring. Water began to distill at about 200° C. When the reaction was carried out at 200° to 220° C for 3 hours, 59 cc of water was distilled and the acid number of the resulting resinous product became 63. The temperature was then reduced to 140° C, and 79.2 g (0.4 mols) of 1,2,3,4-butanetetracarboxylic acid dianhydride and 79.2 g (0.4 mols) of 4,4'-diaminodiphenylmethane were added thereto. The color of the mixture changed to a reddish brown color. When the reaction was carried out at 140° to 180° C for 0.5 hours, the acid number became 82. The temperature was then reduced to 110° C, and 50 g of aqueous ammonia (concentration: above 28%) diluted with 300 g of water was added thereto using the dropping funnel. The mixture was stirred at 100° C for 30 minutes to produce a blackish brown transparent aqueous insulating varnish. This varnish was further diluted with water to a viscosity of 12 poises (B-type viscosimeter, at 30° C). The non-volatile content of this varnish was 41.5% (105 ± 2° C, for 2 hours). The varnish thus obtained was baked and applied onto an annealed copper wire in the same manner as described in Example 1. The properties of the resulting wire are shown in Table 1 below. Further, an aqueous insulating varnish was prepared in the same manner as described above but using 90.8 g (0.4 mols) of 3,4'-diaminobenzanilide in place of the 4,4'-diaminodiphenylmethane as used above. The resulting varnish was applied onto a copper plate as described in Example 1 and baked at 250° C for 10 minutes to obtain a strong coating film having good adhesion to the copper plate.

EXAMPLE 7

154 g (0.8 mols) of trimellitic acid anhydride, 66.4 g (0.4 mols) of terephthalic acid, 58.4 g (0.4 mols) of adipic acid, 124 g (2.0 mols) of ethylene glycol and 64.4 g (0.7 mols) of glycerin were charged in a 1 liter 4-neck flask equipped with a condenser, a thermometer, a dropping funnel and a stirrer, and the mixture was heated with stirring. Water began to distill at about 200° C. When the reaction was carried out at 200° to 220° C for 5 hours, 52 cc of water was distilled and a colorless transparent resinous product having an acid number of 48 was obtained. The temperature was then reduced to 140° C, and 140.4 g (0.6 mols) of 1,2,3,4-butanetetracarboxylic acid and 108.9 g (0.55 mols) of 4,4'-diaminodiphenylmethane were added thereto. When the heating was continued, water began to distill at about 150° C. The reaction was carried out at 160° to 200° C for 1 hour to distill 38 cc of water, by which the acid number became 51. The temperature was then reduced to 110° C, and 50 g of aqueous ammonia (concentration: above 28%) diluted with 300 g of water was added thereto using the dropping funnel. When stirred at 100° C for 30 minutes, a blackish brown transparent aqueous insulating varnish was obtained. This varnish was further diluted with water to a viscosity of 16 poises (B-type viscosimeter, at 30° C). The non-volatile content of this varnish was 40.2% (105 ± 2° C, for 2 hours). The varnish thus obtained was baked and applied onto an annealed copper wire in the same manner as described in Example 1. The properties of the resulting wire are shown in Table 1 below.

EXAMPLE 8

192 g (1.0 mol) of trimellitic acid anhydride, 83 g (0.5 mols) of isophthalic acid, 124 g (2.0 mols) of ethylene glycol and 65 g (0.7 mols) of glycerin were charged in a 2 liter 4-neck flask equipped with a thermometer, a dropping funnel, a condenser and a stirrer, and the mixture was heated with stirring. When the reaction was carried out at 180° to 200° C for 1 hour, 28 cc of water was distilled to obtain a colorless transparent resinous product having 102 of the acid number. The temperature was then reduced to 140° C, and 468 g (2.0 mols) of 1,2,3,4-butanetetracarboxylic acid and 396 g (2.0 mols) of 4,4'-diaminodiphenylmethane were added thereto. The color of the mixture changed to a reddish brown color. When the heating was continued, water began to distill at about 150° C. The reaction was carried out at 160° to 200° C for 2 hours to distill 156 cc of water, by which the acid number became 85. The temperature was then reduced to 110° C, and 150 g of aqueous ammonia (concentration: above 28%) diluted with 300 g of water was added thereto using the dropping funnel. The mixture was stirred at 100° C for 30 minutes to remove the excess ammonia whereby a blackish brown transparent aqueous insulating varnish was obtained. This varnish was diluted with water to a viscosity of 18 poises (B-type viscosimeter, at 30° C). The non-volatile content of this varnish was found to be 40.3% (105 ± 2° C, for 2 hours). The varnish thus obtained was baked and applied onto an annealed copper wire in the same manner as described in Example 1. The properties of the resulting wire are shown in Table 1 below.

EXAMPLE 9

134.4 g (0.7 mols) of trimellitic acid anhydride, 254 g (1.0 mol) of bis-hydroxyethyl terephthalate and 46 g (0.5 mols) of glycerin were charged in a 2 liter 4-neck flask equipped with a condenser, a thermometer, a dropping funnel and a stirrer, and the mixture was heated with stirring. When the reaction was carried out at 180° to 200° C for 1.5 hours, 16 cc of water was distilled to obtain a colorless transparent resinous product having an acid number of 37. The temperature was then reduced to 140° C, and 234 g (1.0 mol) of 1,2,3,4-butanetetracarboxylic acid and 198 g (1.0 mol) of 4,4'-diaminodiphenylmethane were added thereto. When the heating was continued with stirring, water began to distill in the vicinity of 150° C. The reaction was carried out at 160° to 200° C for 0.5 hour to distill 82 cc of water, whereby the acid number of the resin became 96. The temperature was then reduced to 110° C and 90 g of aqueous ammonia (concentration: above 28%) diluted with 200 cc of water was added thereto using the dropping funnel. The mixture was stirred at 100° C for 30 minutes to remove the excess ammonia thereby obtaining a blackish brown transparent aqueous insulating varnish. This varnish was diluted with water to a viscosity of 17 poises (B-type viscosimeter, at 30° C). The non-volatile content of this varnish was found to be 38.6% (105 ± 2° C, for 2 hours). The varnish thus obtained was baked and applied onto an annealed copper wire in the same manner as described in Example 1. The properties of the resulting wire are shown in Table 1 below.

EXAMPLE 10

192 g (1.0 mol) of trimellitic acid anhydride, 83 g (0.5 mols) of isophthalic acid, 124 g (2.0 mols) of ethylene glycol and 65 g (0.7 mols) of glycerin were charged in a 3 liter 4-neck flask equipped with a condensor, a thermometer, a dropping funnel and a stirrer, and the mixture was heated with stirring. When the reaction was carried out at 180° to 200° C for 1 hour, 30 cc of water was distilled to obtain a colorless transparent resinous product having an acid number of 110. The temperature was then reduced to 140° C, and 936 g (4.0 mols) of 1,2,3,4-butanetetracarboxylic acid and 792 g (4.0 mols) of 4,4'-diaminodiphenylmethane were added thereto. The color of the mixture changed to a reddish brown color. When the heating was continued, water began to distill at about 150° C. The reaction was carried out at 160° to 200° C for 2 hours to distill 290 cc of water, by which the acid number of the resin became 82. The temperature was then reduced to 110° C, and 200 g of aqueous ammonia (concentration: above 28%) diluted with 400 g of water was added thereto using the dropping funnel. The mixture was stirred at 100° C for 30 minutes to remove the excess ammonia, by which a blackish brown transparent aqueous insulating varnish was obtained. This varnish was diluted with water to a viscosity of 16 poises (B-type viscosimeter, at 30° C). The non-volatile content of this varnish was 40.3%. The varnish thus obtained was baked and applied onto an annealed copper wire in the same manner as described in Example 1. The properties of the resulting wire are shown in Table 1 below.

EXAMPLE 11

210 g (1.0 mol) of trimesic acid, 49.8 g (0.3 mols) of isophthalic acid, 133.3 g (2.15 mols) of ethylene glycol and 83 g (0.9 mols) of glycerin were charged in a 1 liter 4-necked flask equipped with a condenser, a thermometer, a dropping funnel and a stirrer, and the mixture was heated with stirring. After reaction at 180° to 200° C for 3 hours, 44 cc of water was distilled off to obtain a transparent resinous product having an acid number of 76. At this point, the temperature was reduced to 140° C, and 46.8 g (0.2 mols) of 1,2,3,4-butanetetracarboxylic acid and 60.0 g (0.3 mols) of 4,4'-diaminodiphenyl ether were then added thereto. The resulting mixture turned reddish brown. The heating was continued and water began to distill in the vicinity of 150° C. The mixture was reacted at 160° to 180° for 2 hours to distill off 24 cc of water whereby the acid number of the resin became 46. At this point, the temperature was reduced to 110° C, and 30 g of aqueous ammonia having a concentration more than 28% by weight diluted with 300 g of water was added thereto using the dropping funnel followed by stirring at 100° C for 30 minutes to remove the excess ammonia thereby obtaining a blackish brown transparent aqueous insulating varnish. The resulting varnish was then diluted with water to a viscosity of 15 poises (B-type viscosimeter, at 30° C). The non-volatile content of the varnish was found to be 40.3% (105 ± 2° C, 2 hours). The varnish thus obtained was baked and applied onto an annealed copper wire in the same manner as described in Example 1. The properties of the resulting wire are shown in Table 1 below.

EXAMPLE 12

296 g (1.0 mol) of 3,4,3'-benzophenonetricarboxylic acid anhydride, 127 g (0.5 mols) of bis-hydroxyethylisophthalate, 62 g (1.0 mol) of ethylene glycol and 46 g (0.5 mol) of glycerin were charged in a 1 liter 4-necked flask equipped with a condenser, a thermometer, a dropping funnel and a stirrer, and the resulting mixture was heated while stirring. When the mixture was reacted at 180° to 200° C for 1.5 hours, 25 cc of water was distilled off to obtain a colorless transparent resinous product having an acid number of 74. At this point, the temperature was reduced to 140° C, and 93.6 g (0.4 mols) of 1,2,3,4-butanetetracarboxylic acid and 24.0 g (0.4 mols) of ethylenediamine were added thereto. The heating was further continued while stirring and water began to distill off in the vicinity of 150° C. After reaction at 160° to 180° C for 1 hour, 22 cc of water was distilled off whereby the acid number of the resin became 70. At this point, the temperature was reduced to 110° C, and 50 g of aqueous ammonia (concentration: more than 28% by weight) diluted with 200 cc of water was then added thereto using the dropping funnel. The mixture was stirred at 100° C for 30 minutes to evaporate the excess ammonia to obtain a blackish brown transparent aqueous insulating varnish. The resulting varnish was diluted with water to a viscosity of 20 poises (B-type viscosimeter, at 30° C). The non-volatile content of this varnish was found to be 39.6%. The varnish thus obtained was baked and applied onto an annealed copper wire in the same manner as described in Example 1. The properties of the resulting wire are shown in Table 1 below.

COMPARISON EXAMPLE 388 g (2.0 mols) of dimethyl terephthalate, 124 g (2.0 mols) of ethylene glycol, 74 g (0.8 mols) of glycerin and 0.38 g of zinc acetate were charged in a 1 liter 4-neck flask equipped with a condenser, a thermometer, and a stirrer, and the mixture was heated while stirring. The dimethyl terephthalate was dissolved at 145° C to make the system transparent. Methanol began to distill at about 160° C or so. After the reaction was carried out in the vicinity of 160° to 200° C for 5 hours and then at 220° C for 1 hour, the excess of the alcohol components was removed by distillation under vacuum. Industrial cresol was added to the resulting resin to dissolve the resin so as to have a non-volatile content of 40%. Then, tetrabutyl titanate was added in an amount of about 2% based on the total resin content to produce a baking varnish. The viscosity of this varnish was 30 poises (B-type viscosimeter, at 30° C).

The aqueous insulating varnishes produced in Examples 1 to 12 were applied to annealed copper wires having a diameter of 1.0 mm using dies and baked at 400° C and at a rate of 6.5 m/min by passing the coated wires in a vertical furnace having a height of 3.0 m. The properties of the resulting wires having a baked coating of the varnish of the present invention thereon are shown in Table 1 below.

The properties of the solvent type varnish produced in the Comparison Example are also shown in Table 1. In this case, the baking was carried out in the same manner as described above.

The determination of properties were according to the method described in JIS C-3210 (Polyester Wires Test Method).

Table 1

| | Example | | | | | |
|---|---|---|---|---|---|---|
| | 1 | 2 | 3 | 4 | 5 | 6 |
| Enameled Wire Diameter (mm) | 1.079 | 1.071 | 1.073 | 1.073 | 1.075 | 1.071 |
| Bare Wire Diameter (mm) | 0.995 | 0.995 | 0.995 | 0.995 | 0.995 | 0.995 |
| Film Thickness (mm) | 0.042 | 0.038 | 0.039 | 0.039 | 0.040 | 0.038 |
| Windability | | | | | | |
| Self-diameter Windability (normal condition) | good | good | good | good | good | good |
| Self-diameter Windability (20% prestretched) | good | good | good | good | good | good |
| Windability (good diameter - 200° C × 24 hours) | 2d | 2d | 1d | 2d | 1d | 2d |
| Abrasion Resistance (reciprocating, 600 g wt) (cycle times) | 40 | 48 | 43 | 38 | 52 | 46 |
| Cut-Through Temperature (° C) 2 kg load (2° C/min) | 315 | 340 | 352 | 321 | 350 | 341 |
| Heat Shock Resistance 180° C × 2 hours (good diameter) | 2d | 2d | 1d | 2d | 1d | 2d |
| Dielectric Breakdown (KV) | 13.1 | 13.7 | 11.9 | 12.4 | 13.1 | 13.2 |
| Wrench Resistance (cycle times) | 92 | 94 | 95 | 91 | 90 | 90 |
| Chemical Resistance (after dipping at room temperature for 24 hours) | | | | | | |
| Pencil hardness at normal conditions | 5H | 5H | 5H | 5H | 5H | 5H |
| Pencil hardness after dipping in 5% sodium hydroxide | 4H | 5H | 5H | 5H | 5H | 5H |
| Pencil hardness after dipping in sulfuric acid (specific gravity: 1.2) | 5H | 5H | 5H | 5H | 5H | 5H |

| | Example | | | | | | Comparison |
|---|---|---|---|---|---|---|---|
| | 7 | 8 | 9 | 10 | 11 | 12 | |
| Enameled Wire Diameter (mm) | 1.073 | 1.075 | 1.072 | 1.071 | 1.075 | 1.073 | 1.080 |
| Bare Wire Diameter (mm) | 0.995 | 0.995 | 0.995 | 0.995 | 0.995 | 0.995 | 0.995 |
| Film Thickness (mm) | 0.039 | 0.040 | 0.038 | 0.038 | 0.040 | 0.039 | 0.043 |
| Windability | | | | | | | |
| Self-diameter Windability (normal condition) | good | good | good | good | good | good | good |
| Self-diameter Windability (20% prestretched) | good | good | good | good | good | good | good |
| Windability (good diameter - 200° C × 24 hours) | 2d | 1d | 1d | 1d | 2d | 2d | 2d |

Table 1-continued

| | | | | | | | |
|---|---|---|---|---|---|---|---|
| Abrasion Resistance (reciprocating, 600 g wt) (cycle times) | 51 | 78 | 65 | 91 | 68 | 73 | 40 |
| Cut-Through Temperature (° C) 2 kg load (20° C/min) | 338 | 421 | 388 | 435 | 342 | 315 | 310 |
| Heat Shock Resistance 180° C × 2 hours (good diameter) | 2d | 1d | 1d | 1d | 2d | 3d | 4d |
| Dielectric Breakdown (KV) | 13.8 | 13.3 | 13.9 | 14.2 | 13.0 | 14.3 | 12.6 |
| Wrench Resistance (cycle times) | 93 | 93 | 89 | 88 | 89 | 92 | 85 |
| Chemical Resistance (after dipping at room temperature for 24 hours) | | | | | | | |
| Pencil hardness at normal conditions | 5H | 5H | 5H | 5H | 5H | 5H | 5H |
| Pencil hardness after dipping in 5% sodium hydroxide | 5H | 5H | 5H | 5H | 5H | 5H | HB |
| Pencil hardness after dipping in sulfuric acid (specific gravity: 1.2) | 5H | 5H | 5H | 5H | 5H | 5H | 5H |

According to the present invention, as described above, the resulting baked coating films have more excellent properties in heat resistance and chemical resistance than those of the prior art solvent type varnishes wherein solvents such as cresol, xylene and naphtha are used. Further, since water is used as a medium, the varnishes of the present invention do not cause air pollution at baking, because solvents or harmful gases are not vaporized into the air at baking. Consequently, the working environment is very safe and fire is not a danger. Furthermore, they are much cheaper than the prior art solvent type varnishes because water is used as the medium, and they have a very high industrial value.

While the invention has been described in detail and with reference to specific embodiments thereof, it will be apparent to one skilled in the art that various changes and modifications can be made therein without departing from the spirit and scope thereof.

What is claimed is:

1. An aqueous insulating varnish which comprises an aqueous medium containing dissolved therein a resin containing ester groups, imide groups and free carboxyl groups in the resin molecule having an acid number of 20 to 100, with a volatile base selected from the group consisting of ammonia and a volatile organic amine to render the resin soluble, the resin comprising the reaction product of (A) 100 parts of a carboxyl group containing polyol containing ester groups in the molecule comprising the reaction product of
   1. an organic carboxylic acid component comprising
      a. about 15 to 100 mol% of at least one of an aromatic tricarboxylic acid and the anhydride thereof in which up to 30 mol% of the aromatic tricarboxylic acid and the anhydride thereof can be replaced by at least one of an aromatic tetracarboxylic acid and the anhydride thereof, and
   2. an organic alcohol component comprising at least one organic polyhydric alcohol;
B. 2.5 to 250 parts of a member selected from the group consisting of butanetetracarboxylic acid, an imide-forming derivative thereof and mixture; and
C. at least one organic diamine, the molar ratio of butanetetracarboxylic acid or said imide-forming derivative thereof to organic diamine being 1/4 to 5.

2. The aqueous insulating varnish of claim 1, wherein said aromatic tricarboxylic acid is (i) trimellitic acid or the anhydride thereof, hemimellitic acid or the anhydride thereof or trimesic acid having the formula

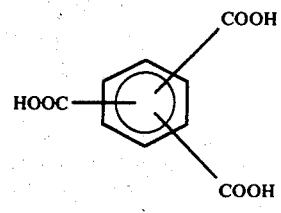

ii: a diphenyltricarboxylic acid having the formula

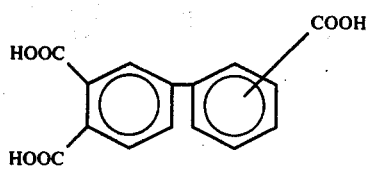

or the anhydride thereof, (iii) a tricarboxydiphenylmethane, a tricarboxydiphenyl ether, a tricarboxydiphenyl sulfide, a tricarboxydiphenyl sufone, a tricarboxydiphenyl ketone or a tricarboxydiphenylpropane having the formula

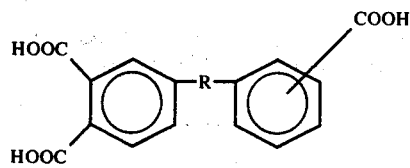

wherein R represents a methylene group, an oxygen atom, a sulfur atom, a —SO$_2$— group, a

group or a

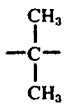

group or the anhydride thereof or (iv) mixtures thereof, wherein said dicarboxylic acid is (i) succinic acid; (ii) succinic anhydride; (iii) malonic acid; (iv) adipic acid; (v) sebacic acid; (vi) phthalic acid; (vii) phthalic anhydride; (viii) terephthalic acid; (ix) isophthalic acid; (x) a naphthalenedicarboxylic acid having the formula

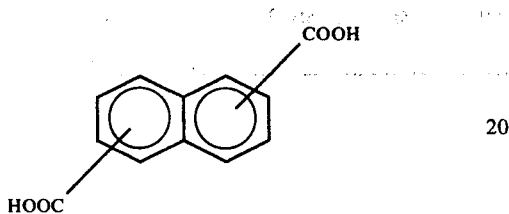

(xi) a dicarboxydiphenyl having the formula

(xii) a dicarboxydiphenylmethane, a dicarboxydiphenyl ether, a dicarboxydiphenyl sulfone, a dicarboxydiphenyl ketone, a dicarboxydiphenylpropane or a dicarboxydiphenyl sulfide having the formula

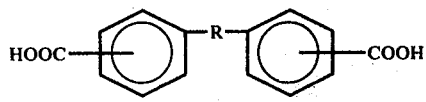

wherein R represents a methylene group, an oxygen atom, a sulfur atom, a —SO$_2$— group, a

group or a

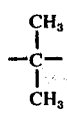

group; or (xiii) mixtures thereof;

wherein said organic polyhydric alcohol is ethylene glycol, propylene glycol, 1,4-butanediol, 1,5-pentanediol, 1,6-hexanediol, 1,7-heptanediol, 1,8-octanediol, 1,9-nonanediol, 1,10-decanediol, diethylene glycol, dipropylene glycol, triethylene glycol, glycerin, trimethylolpropane, tris(2-hydroxyethyl)isocyanurate, 1,2,6-hexanetriol, 3-methyl-1,3,5-hexanetriol, pentaerythritol, 4,4'-dihydroxymethyldiphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'-dihydroxymethyldiphenyl sulfone, 4,4'-dihydroxyethyldiphenyl sulfone, 4,4'-dihydroxymethyldiphenyl ketone, 4,4'dihydroxyethyldiphenyl ketone, 4,4'-dihydroxymethyldiphenylpropane, 4,4'-dihydroxyethyldiphenylpropane, 4,4'-dihydroxymethyl sulfide, 4,4'-dihydroxyethyldiphenyl sulfide, bis(2hydroxyethyl)terephthalate, bis(2-hydroxyethyl)isophthalate, bis(3-hydroxypropyl)-terephthalate and oligomers thereof and mixtures thereof; and wherein said organic diamine is (i) H$_2$N(CH$_2$)$_n$NH$_2$, wherein n is an integer not greater than 10;

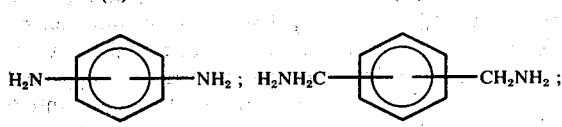

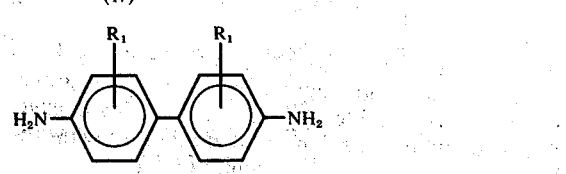

wherein R$_1$ represents a hydrogen atom, an alkoxy group, an alkyl group or a halogen atom;

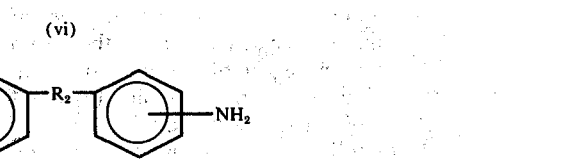

wherein R$_2$ represents —CH$_2$—, —O—, —CH$_2$CH$_2$—, —CONH—,

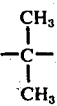

—S— or —SO$_2$—; (vii) 2,4-bis(β-amino-t-butyl) toluene; or (viii) bis [p(β-amino-t-butyl)phenyl] ether.

3. The aqueous insulating varnish of claim 1, wherein said carboxyl group containing polyol has an acid number ranging from about 10 to 150.

4. The aqueous insulating varnish of claim 1, wherein said volatile base is ammonia, a trialkylamine, an N-alkyldiethanolamine, an N,N-dialkylethanolamine, monoethanolamine, diethanolamine, triethanolamine or mixtures thereof.

5. The aqueous insulating varnish of claim 1, wherein said butanetetracarboxylic acid or imide-forming derivative thereof is butanetetracarboxylic acid, butanetetracarboxylic acid monoanhydride, butanetetracarboxylic acid dianhydride, butanetetracarboxylic acid dimethyl ester, butanetetracarboxylic diethyl ester, butanetetracarboxylic dipropyl ester, butanetetracarboxylic dibutyl ester, butanetetracarboxylic diamide, butanetetracarboxylic diammonium salt, or mixtures thereof.

6. The aqueous insulating varnish of claim 1, wherein said aromatic tricarboxylic acid or anhydride thereof is present in an amount of 50 to 100 mol%.

7. The aqueous insulating varnish of claim 1, wherein the molar ratio of the carboxyl group content in the organic acid component to the hydroxyl group content in the organic alcohol component ranges from about 1:1 to 1:3.

8. The aqueous insulating varnish of claim 1, wherein the resin containing ester groups, imide groups and free carboxyl groups in the resin molecule has an acid number of about 20 to 100.

9. The aqueous insulating varnish of claim 1, wherein said varnish has a concentration ranging from about 30 to 55% by weight and a viscosity at 30° C measured with a B-type viscosimeter ranging from about 1 to 100 poises.

10. The aqueous insulating varnish of claim 1, wherein said varnish contains from 0.3 to 3 equivalents of said volatile base to said equivalents of free carboxyl group in said resin.

11. The aqueous insulating varnish of claim 1, wherein said varnish includes a film-forming assistant.

12. A wire enamel comprising the aqueous insulating varnish of Claim 1.

13. A coated article comprising an article having thereon a coated and baked layer of the aqueous insulating varnish of Claim 1.

14. The aqueous insulating varnish of claim 1 wherein the imide-forming derivative of butanetetracarboxylic acid is selected from the group of imide-forming derivatives comprising butanetetracarboxylic acid monoanhydride, butanetetracarboxylic dianhydride, butanetetracarboxylic acid dimethyl ester, butanetetracarboxylic acid diethyl ester, butanetetracarboxylic dipropyl ester, butanetetracarboxylic dibutyl ester, the butanetetracarboxylic diamides and the butanetetracarboxylic acid diammonium salt.

* * * * *